Figures 1, 2:
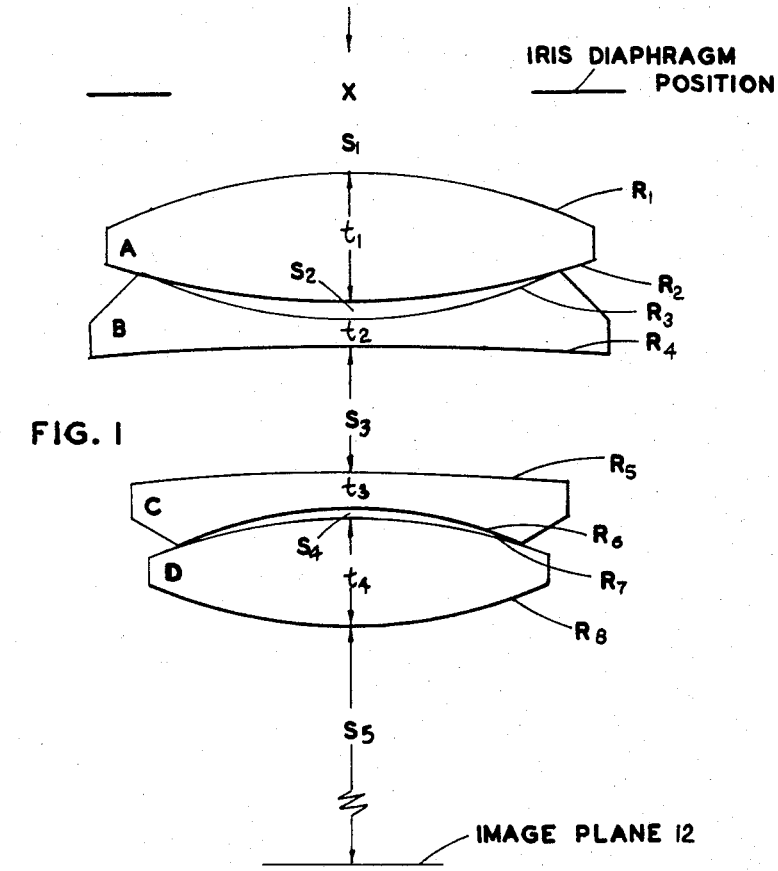

May 25, 1965     E. I. BETENSKY     3,185,033

MODIFIED PETZVAL TYPE PHOTOGRAPHIC OBJECTIVE

Filed Sept. 27, 1962

IMAGE PLANE 12

| E.F.L. = 13.205 | B.F.L. = 9.82 | | f/1.6 | | |
|---|---|---|---|---|---|
| LENS | FOCAL LENGTH | RADII | THICKNESS | SPACES | $n_D$ | $V$ |
| A | $F_A$ = 10.127 | $R_1$ = 11.1686<br>$-R_2$ = 14.9968 | $t_1$ = 2.5 | $S_1$ = 1.5 | 1.657 | 50.9 |
| B | $F_B$ = -13.256 | $-R_3$ = 10.00<br>$R_4$ = 63.0952 | $t_2$ = .62 | $S_2$ = .291<br>$S_3$ = 2.4 | 1.649 | 33.8 |
| C | $F_C$ = -15.543 | $R_5$ = 44.4831<br>$R_6$ = 8.1658 | $t_3$ = .68 | $S_4$ = .257 | 1.649 | 33.8 |
| D | $F_D$ = 8.468 | $R_7$ = 11.8032<br>$-R_8$ = 9.8174 | $t_4$ = 2.0 | $S_5$ = 9.82 | 1.657 | 50.9 |

INVENTOR.
ELLIS I. BETENSKY

BY Frank C. Parker

ATTORNEY

3,185,033
MODIFIED PETZVAL TYPE PHOTOGRAPHIC OBJECTIVE

Ellis I. Betensky, Rochester, N.Y., assignor to Bausch & Lomb Incorporated, Rochester, N.Y., a corporation of New York
Filed Sept. 27, 1962, Ser. No. 226,642
3 Claims. (Cl. 88—57)

The present invention relates to a photographic objective of the modified Petzval type having a large relative aperture and relates more particularly to improvements in such objectives.

It is an object of the present invention to provide a novel photographic objective having a relative aperture as large as $f/1.6$ particularly for use in 8 mm. cameras, said objective having a long back focus and being corrected in a superior manner for spherical and chromatic aberrations, coma, astigmatism and field curvature while being of low cost and simple construction.

Further objects and advantages of this invention will be found by those skilled in this art in the constructional details as set forth in the specification herebelow taken together with the accompanying drawing wherein FIG. 1 is an optical diagram showing one form of an objective constructed according to this invention, and FIG. 2 is a chart of constructional data related to said objective.

An objective of the above mentioned type having an unusually large relative aperture as large as $f/1.6$ is designated by the numeral 10 in the drawing, the objective being provided with a diaphragm 11 located in front of said objective. Said objective forms an image rearwardly thereof at an image plane 12 which is located at an unusually long back focal distance of substantially $.743F$ where F represents the equivalent focal length of the objective.

Said objective is composed of a front group of lenses including a double convex singlet lens A in contact with a rear double concave singlet lens B, and an optically aligned rear lens group which is airspaced from the front group and includes a negative meniscus singlet lens C which is in contact with a rear double convex lens D. Airspaces $S_2$ and $S_4$ are provided between lenses A and B and between lenses C and D respectively as hereinafter specified.

In order to achieve a superior correction of the spherical and chromatic image aberrations along with such conditions as coma, astigmatism and field curvature in an objective of such a large relative aperture as $f/1.6$ and long back focus, the necessary constructional data for the objective is specified in ranges of values in the table herebelow, wherein $F_A$ to $F_D$ designate the individual focal lengths of the successive lenses A to D, $R_1$ to $R_8$ designates the radius of the successive lens surfaces and the accompanying minus (—) sign applies to radii whose centers of curvature lie on the object side of the vertex of the lens surface, $t_1$ to $t_4$ are the successive axial thicknesses of said lenses, $S_1$ to $S_5$ designate the successive airspaces surrounding said lenses, and $n_D$ and $\nu$ represent the corresponding refractive index and Abbé number respectively of the glass from which the lenses are made, and F designates the equivalent focal length of said objective.

$$F_A = .768F$$
$$-F_B = 1.003F$$
$$-F_C = 1.177F$$
$$F_D = .641F$$
$$.809F < R_1 < .987F$$
$$1.038F < -R_2 < 1.268F$$
$$.682F < -R_3 < .846F$$
$$4.36F < R_4 < 5.32F$$
$$3.08F < R_5 < 3.76F$$
$$.565F < R_6 < .689F$$
$$.817F < R_7 < .999F$$
$$.678F < -R_8 < .828F$$
$$.1733F < t_1 < .2117F$$
$$.0429F < t_2 < .0523F$$
$$.0461F < t_3 < .0575F$$
$$.1375F < t_4 < .1693F$$
$$.1012F < S_1 < .1248F$$
$$.0202F < S_2 < .0246F$$
$$.1661F < S_3 < .2029F$$
$$.01778F < S_4 < .02172F$$
$$.669F < S_5 < .817F$$
$$1.652 < n_D(A) < 1.662$$
$$1.644 < n_D(B) < 1.654$$
$$1.644 < n_D(C) < 1.654$$
$$1.652 < n_D(D) < 1.662$$
$$45.0 < \nu(A) < 55.0$$
$$30.0 < \nu(B) < 38.0$$
$$30.0 < \nu(C) < 38.0$$
$$45.0 < \nu(D) < 55.0$$

A more specific statement of the constructional data for one form of objective according to the present invention is given in the table herebelow wherein the designations have the same meaning as given in the table hereabove.

| | |
|---|---|
| $R_1 = .898F$ | $S_2 = .0224F$ |
| $-R_2 = 1.153F$ | $S_3 = .1845F$ |
| $-R_3 = .769F$ | $S_4 = .01975F$ |
| $R_4 = 4.84F$ | $S_5 = .743F$ |
| $R_5 = 3.42F$ | $n_D(A) = 1.657$ |
| $R_6 = .627F$ | $n_D(B) = 1.649$ |
| $R_7 = .908F$ | $n_D(C) = 1.649$ |
| $-R_8 = .753F$ | $n_D(D) = 1.657$ |
| $t_1 = .1925F$ | $\nu(A) = 50.9$ |
| $t_2 = .0476F$ | $\nu(B) = 33.8$ |
| $t_3 = .0523F$ | $\nu(C) = 33.8$ |
| $t_4 = .1539F$ | $\nu(D) = 50.9$ |
| $S_1 = .1135F$ | |

A numerical example of one successful form of the present invention is given in the following chart of values, the designations used therein having the same meaning as given hereabove, and where E.F.L. and B.F.L. designate equivalent focal length and back focal length respectively.

[E.F.L.=13.205   B.F.L.=9.82   f/1.6]

| Lens | Radii | Focal Length | Thickness | Spacing | $n_D$ | $\nu$ |
|---|---|---|---|---|---|---|
| A | $R_1=11.1686$<br>$-R_2=14.9968$ | $F_A=10.127$ | $t_1=2.5$ | $S_1=1.5$<br>$S_2=.291$ | 1.657 | 50.9 |
| B | $-R_3=10.000$<br>$R_4=63.0952$ | $F_B=-13.256$ | $t_2=.62$ | $S_3=2.4$ | 1.649 | 33.8 |
| C | $R_5=44.4831$<br>$R_6=8.1658$ | $F_C=-15.543$ | $t_3=.68$ | $S_4=.257$ | 1.649 | 33.8 |
| D | $R_7=11.8032$<br>$-R_8=9.8174$ | $F_D=8.468$ | $t_4=2.0$ | $S_5=9.82$ | 1.657 | 50.9 | wherein all scalar quantities are given in millimeters.

Although only one specific form of the present invention is shown and described in detail, it will be understood that other forms are possible and may be made in all numerical specifications of the parameters of said objective without departing from the spirit of this invention as claimed herebelow:

I claim:

1. A photographic objective of modified Petzval type having a relative aperture as large as $f/1.6$ and being corrected in a superior manner for chromatic and spherical abberrations, coma, astigmatism and field curvature, said objective comprising a front group of lenses spaced from and optically aligned with a rear group of lenses and a diaphragm located in spaced relation to the object side of said front groups, said front group including a double convex positive lens A in contact with the concave side of a rearward plano concave negative lens B, both lenses being singlets, said rear group including a negative meniscus lens C having a concave side in contact with a rearwardly located positive double convex lens D, both lenses being singlets, the values of radius for the successive lens surfaces $R_1$ to $R_8$ being given in the table of mathematical inequalities herebelow wherein F designates the equivalent focal length of said objective, $$.809F<R_1<.987F$$
$$1.038F<-R_2<1.268F$$
$$.682F<-R_3<.846F$$
$$4.36F<R_4<5.32F$$
$$3.08F<R_5<3.76F$$
$$.565F<R_6<.689F$$
$$.817F<R_7<.999F$$
$$.678F<-R_8<.828F$$

wherein the minus (—) sign applies to radii whose centers of curvature lie on the object side of the vertex of the lens surface, the values of the successive lens thicknesses designated $t_1$ to $t_4$, and the successive axial lens spacings $S_1$ to $S_5$ between said diaphragm and the image plane of the objective being as specified in the table of mathematical statements herebelow, $$.1733F<t_1<.2117F$$
$$.0429F<t_2<.0523F$$
$$.0461F<t_3<.0575F$$
$$.1375F<t_4<.1693F$$
$$.1012F<S_1<.1248F$$
$$.0202F<S_2<.0246F$$
$$.1661F<S_3<.2029F$$
$$.017778F<S_4<.02172F$$
$$.669F<S_5<.817F$$

the values of refractive index $n_D(A)$ to $n_D(D)$ and the values of Abbé number $\nu(A)$ to $\nu(B)$ for the glasses in the successive lenses A to D being specified in the table of mathematical statements herebelow, $$1.652<n_D(A)<1.662$$
$$1.644<n_D(B)<1.654$$
$$1.644<n_D(C)<1.654$$
$$1.652<n_D(D)<1.662$$
$$45.0<\nu(A)<55.0$$
$$30.0<\nu(B)<38.0$$
$$30.0<\nu(C)<38.0$$
$$45.0<\nu(D)<55.0$$

2. A photographic objective of modified Petzval type having a relative aperture as large as $f/1.6$ and being corrected in a superior manner for chromatic and spherical aberrations, coma, astigmatism and field curvature, said objective comprising a front group of lenses spaced from and optically aligned with a rear group of lenses and a diaphragm located in spaced relation to the object side of said front groups, said front group including a double convex positive lens A in contact with the concave side of a rearward plano concave negative lens B, both lenses being singlets, said rear group including a negative meniscus lens C having a concave side in contact with a rearwardly located positive double convex lens D, both lenses being singlets, the values of radius for the successive lens surfaces $R_1$ to $R_8$ being given in the table of mathematical statements herebelow wherein F designates the equivalent focal length of said objective,

| | |
|---|---|
| $R_1=.898F$ | $R_5=3.42F$ |
| $-R_2=1.153F$ | $R_6=.627F$ |
| $-R_3=.769F$ | $R_7=.908F$ |
| $R_4=4.84F$ | $-R_8=.753F$ | wherein the minus (—) sign applies to radii whose centers of curvature lie on the object side of the vertex of the lens surface, the successive lens thicknesses designated $t_1$ to $t_4$, and the successive axial lens spacing $S_1$ to $S_5$ between said diaphragm and the image plane being specified in the table of mathematical statements herebelow,

| | |
|---|---|
| $t_1=.1925F$ | $S_2=.0224F$ |
| $t_2=.0476F$ | $S_3=.1845F$ |
| $t_3=.0523F$ | $S_4=.01975F$ |
| $t_4=.1539F$ | $S_5=.743F$ |
| $S_1=.1135F$ | (back focal length) | the values of refractive index $n_D$ and Abbé number $\nu$ being stated in the table herebelow,

| | |
|---|---|
| $n_D(A)=1.657$ | $\nu(A)=50.9$ |
| $n_D(B)=1.649$ | $\nu(B)=33.8$ |
| $n_D(C)=1.649$ | $\nu(C)=33.8$ |
| $n_D(D)=1.657$ | $\nu(D)=50.9$ |

3. A photographic objective of modified Petzval type having a relative aperture as large as $f/1.6$ and being corrected in a superior manner for chromatic and spherical aberrations, coma, astigmatism and field curvature, said objective comprising a front group of lenses spaced from and optically aligned with a rear group of lenses and a diaphragm located in spaced relation to the object side of said front groups, said front group including a double convex positive lens A in contact with the concave side of a rearward plano concave negative lens B, both lenses being singlets, said rear group including a negative meniscus lens C having a concave side in contact with a rearwardly located positive double convex lens D, both lenses being singlets, the constructional data for said objective being given in the chart of values herebelow wherein $R_1$ to $R_8$ designate the successive lens radii and the minus (—) sign applies to radii whose centers of curvature lie on the object side of the vertex of the lens surface, $F_A$ to $F_D$ designate the focal lengths, $t_1$ to $t_4$ represents the successive lens thicknesses, $S_1$ to $S_5$ represents the successive axial airspaces between said diaphragm and the image produced by the objective, and $n_D$ and $\nu$ designate respectively the refractive index and Abbé number respectively of the glass from which the lenses are made, and E.F.L. and B.F.L. designate respectively equivalent focal length and back focal length,

[E.F.L.=13.205   B.F.L.=9.82   F/1.6]

| Lens | Radii | Focal Length | Thickness | Spacing | $n_D$ | $\nu$ |
|---|---|---|---|---|---|---|
| A | $R_1$=11.1686<br>−$R_2$=14.9968 | $F_A$=10.127 | $t_1$=2.5 | $S_1$=1.5<br><br>$S_2$=.291 | 1.657 | 50.9 |
| B | −$R_3$=10.000<br>$R_4$=63.0952 | $F_B$=−13.256 | $t_2$=.62 | $S_3$=2.4 | 1.649 | 33.8 |
| C | $R_5$=44.4831<br>$R_6$=8.1658 | $F_C$=−15.543 | $t_3$=.68 | $S_4$=.257 | 1.649 | 33.8 |
| D | $R_7$=11.8032<br>−$R_8$=9.8174 | $F_D$=8.468 | $t_4$=2.0 | $S_5$=9.82 | 1.657 | 50.9 |

All scalar dimensions are stated in millimeters.

References Cited by the Examiner

UNITED STATES PATENTS 1,620,337  3/27  Frederick et al. _____ 88—57
2,962,930  12/60  Johnson _____ 88—57

FOREIGN PATENTS 329,144  5/30  Great Britain.

JEWELL H. PEDERSEN, *Primary Examiner.*